US010107902B2

(12) United States Patent
Curtis et al.

(10) Patent No.: US 10,107,902 B2
(45) Date of Patent: Oct. 23, 2018

(54) CORE INDEPENDENT PERIPHERAL BASED ULTRASONIC RANGING PERIPHERAL

(71) Applicant: Microchip Technology Incorporated, Chandler, AZ (US)

(72) Inventors: Keith Curtis, Gilbert, AZ (US); Anthony Stram, Chandler, AZ (US); Kristine Angelica Sumague, Batangas (PH)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 114 days.

(21) Appl. No.: 15/278,984

(22) Filed: Sep. 28, 2016

(65) Prior Publication Data

US 2017/0090022 A1 Mar. 30, 2017

Related U.S. Application Data

(60) Provisional application No. 62/234,362, filed on Sep. 29, 2015.

(51) Int. Cl.
*G01S 7/00* (2006.01)
*G01S 7/521* (2006.01)
(Continued)

(52) U.S. Cl.
CPC .............. *G01S 7/521* (2013.01); *G01S 7/523* (2013.01); *G01S 15/08* (2013.01); *G01S 15/10* (2013.01)

(58) Field of Classification Search
CPC .......... G01S 7/521; G01S 15/10; G01S 15/08; G01S 7/523
See application file for complete search history.

(56) References Cited

U.S. PATENT DOCUMENTS 3,914,987 A 10/1975 Bickel et al. .................. 73/609
4,439,846 A 3/1984 Rodriguez ..................... 367/99
(Continued)

OTHER PUBLICATIONS

International Search Report and Written Opinion, Application No. PCT/US2015/054301, 13 pages, dated Jan. 5, 2017.
(Continued)

*Primary Examiner* — Hovhannes Baghdasaryan
(74) *Attorney, Agent, or Firm* — Slayden Grubert Beard PLLC

(57) ABSTRACT

A ranging function is implemented using a collection of core independent peripherals (CIPs) in a microcontroller without software overhead to the central processor during operation thereof. A pulse width modulation (PWM) peripheral generates a high frequency drive signal, a counter to set the duration of the PWM drive signal (pulse), and a second timer coupled to a comparator to measure the time it takes to receive back a reflection of the ranging signal from an object. The ranging peripheral starts ranging with ultrasonic pulses, and when corresponding reflected ultrasonic pulse are receives an interrupt signal is provided when the ranging measurement is complete. Time dependent sensitivity and/or gain adjustments are contemplated. The ultrasonic ranging peripheral uses on chip resources for most of its functions and therefore requires very few external components. It's set and forget nature may be based on CIP based timers, signal generators and configurable logic cells.

29 Claims, 5 Drawing Sheets

(51) Int. Cl.
*G01S 15/08* (2006.01)
*G01S 7/523* (2006.01)
*G01S 15/10* (2006.01)

(56) References Cited

U.S. PATENT DOCUMENTS

| | | | | |
|---|---|---|---|---|
| 4,451,909 | A | | 5/1984 | Kodera et al. .................. 367/99 |
| 5,159,837 | A | | 11/1992 | Wada ............................... 73/602 |
| 5,528,217 | A | * | 6/1996 | Adams .................. B60Q 9/008 180/169 |
| 6,314,055 | B1 | * | 11/2001 | Foxlin ..................... G01S 7/523 367/127 |
| 2003/0060163 | A1 | | 3/2003 | Filkin et al. ................ 455/67.11 |
| 2006/0022680 | A1 | * | 2/2006 | Suginouchi ......... G01F 23/2962 324/635 |

OTHER PUBLICATIONS

Partial International Search Report and Invitation to Pay Additional Fees, Application No. PCT/US2017/020603, 11 pages, dated May 18, 2017.

Microchip Technology Incorporated, "Section 19. Dual Comparator Module," URL: http://ww1.microchip.com/downloads/en/DeviceDoc/39710b.podf, 12 pages, Jan. 5, 2010.
Microchip Technology Incorporated, "Section 55. Data Signal Modulator (DSM)" URL: http://ww1.microchip.com/downloads/en/DeviceDoc/39744a.pdf, 16 pages, May 11, 2011.
Microchip Technology Incorporated, "Section 10. I/O Ports," URL: http://ww1.microchip.com/downloads/en/DeviceDoc/70193D.pdf, 14 pages, Nov. 29, 2011.
Microchip Technology Incorporated, "Section 64. Capture/Compare/PWM/Timer (MCCP and SCCP)," URL: http://ww1.microchip.com/downloads/en/DeviceDoc/33035a.podf, 64 pages © 2013.
Curtis, Keith, "AN1536: Ultrasonic Range Detection," Microchip Technology Incorporated, URL: http://ww1.microchip.com/downloads/en/AppNotes/00001536A.podf, 14 pages, Oct. 28, 2013.
Microchip Technology Incorporated, "MPLAB® Code Configurator User's Guide," URL: http://ww1.microchip.com/downloads/en/DeviceDoc/40001725B.pdf, 24 pages, Mar. 25, 2014.

* cited by examiner

CORE INDEPENDENT PERIPHERAL BASED ULTRASONIC RANGING PERIPHERAL

RELATED PATENT APPLICATION

This application claims priority to U.S. Provisional Patent Application No. 62/234,362; filed Sep. 29, 2015; which is hereby incorporated by reference herein for all purposes.

TECHNICAL FIELD

The present disclosure relates to peripheral devices in a microcontroller or system on a chip, and, in particular, to core independent peripheral devices used for an ultrasonic ranging peripheral.

BACKGROUND

A core independent peripheral (CIP) is a peripheral device in a microcontroller, or system on a chip, that does not require support from the central processing unit (CPU) of the microcontroller for its operation, while the CPU may be used to initialize and configure such a peripheral device. Thus, once such a CIP device is configured and started, for example by the CPU, it operates on its own and frees processing power of the CPU core for other tasks. For example a counter, once triggered, starts counting independently from the CPU, a direct memory access controller performs block transfers from/to memory without CPU interaction, etc. Using CIPs decrease parts count, manufacturing costs, and increase reliability and versatility of a product. Many products greatly benefit from such cost savings, increased versatility and reliability. One such product may be used for ultrasonic ranging applications.

SUMMARY

Therefore a need exists for an ultrasonic ranging device comprising cost effective core independent peripherals (CIPs) that may be provided in a microcontroller.

According to an embodiment, an ultrasonic ranging measurement device may comprise: a microcontroller comprising a central processor and memory, a plurality of core independent peripherals (CIPs) selected from the group consisting of any one or more of a capture compare pulse width modulation (CCP), a comparator (CMP), a configurable logic cell (CLC), a data signal modulator (DSM), a hardware limit timer (HLT), a fixed voltage reference (FVR), an operational amplifier (OPA), a programmable ramp generator (PRG), a pulse width modulation generator (PWM), and a timer counter register (TMR); an ultrasonic transmitting transducer coupled to the DSM; and an ultrasonic receiving transducer coupled to a receive OPA; wherein the selected CIPs may be configured to generate signals to be transmitted as ultrasonic pulses from the ultrasonic transmitting transducer, receive signals representing reflected ultrasonic pulses from an object with the ultrasonic receiving transducer, detect the reflected ultrasonic pulse signals, and store times between the transmitted ultrasonic pulse signals and the corresponding reflected ultrasonic pulse signals that may be received and detected.

According to a further embodiment, the CIPs may generate the ultrasonic pulse signals, receive and detect the reflected ultrasonic pulse signals and store the times between the transmitted ultrasonic pulse signals and the corresponding reflected ultrasonic pulse signals without intervention from the central processor of the microcontroller. According to a further embodiment, logic functions of the CLC may be selected from the group consisting of a flip-flop, a NOR gate, an NAND gate, a XNOR gate, an AND gate, an OR gate, and a XOR gate. According to a further embodiment, the CLC may comprise at least two of the logic functions.

According to a further embodiment: an output from the DSM may be coupled to the ultrasonic transmitting transducer; the PWM may be coupled to a first input of the DSM; a first CLC may be configured as a RS flip-flop and may have an output coupled to a second input of the DSM; and a first TMR may have an input coupled to the output of the DSM, and an output coupled to a reset input of the first CLC; wherein a start signal may be coupled to a set input of the first CLC, whereby an ultrasonic pulse may be generated each time the start signal may be asserted and the ultrasonic pulse may have a pulse duration determined by the first TMR.

According to a further embodiment may comprise: a peak voltage detector that may be coupled to an output of the receive OPA; a CMP that may have a first input coupled to an output of the peak voltage detector, and a second input coupled to a FVR, wherein when a voltage from the peak voltage detector may be greater than a reference voltage from the FVR an output of the CMP may change from a first logic level to a second logic level; and a CCP may have inputs coupled to a second TMR, wherein the CCP stores a time count value from the second TMR when the CMP output may change from the first logic level to the second logic level; wherein the second TMR may reset back to a zero time count value after the start signal may be asserted.

According to a further embodiment may comprise: a third TMR may be configured as a one-shot timer and may be coupled between the output of the first CLC and a set input of a second CLC; and the second CLC may have a reset input coupled to the start signal and an output coupled to a start input of the second TMR; wherein the second CLC may start the second TMR counting after the third TMR one-shot timer may have timed out.

According to a further embodiment may comprise: a done signal from the output of the CMP when the reflected ultrasonic pulse may be detected; and a fault signal from the second TMR when no reflected ultrasonic pulse may be detected. According to a further embodiment, the input to the receive OPA may comprise differential inputs coupled to the ultrasonic receiving transducer that may have differential outputs.

According to a further embodiment may comprise: a peak voltage detector may be coupled to an output of the receive OPA; a CMP may have a first input coupled to an output of the peak voltage detector, and a second input coupled to a PRG, wherein when a voltage from the peak voltage detector may be greater than a voltage from the PRG an output of the CMP may change from a first logic level to a second logic level; and a CCP may have inputs coupled to a second TMR, wherein the CCP may store a time count value from the second TMR when the CMP output may change from the first logic level to the second logic level; wherein the second TMR may reset back to a zero time count value after the start signal may be asserted.

According to a further embodiment, the voltage from the PRG may decrease over time, thereby that may cause the CMP to change from the first logic level to the second logic level at a lower voltage from the peak voltage detector over time. According to a further embodiment, an input to the PRG may be coupled to a FVR. According to a further embodiment, a buffer OPA may be coupled between the PRG and the second input of the CMP. According to a further embodiment, the receive OPA may be a gain controllable OPA, and may further comprise a PRG coupled to and controlling the gain of the gain controllable OPA, wherein the PRG may cause the gain of the gain controllable OPA to increase over time, thereby increasing receive sensitivity for the reflected ultrasonic pulse.

According to a further embodiment, the PRG may start increasing the receive sensitivity of the receive OPA once the second TMR starts counting. According to a further embodiment, the ultrasonic pulses may be at about 40 kHz. According to a further embodiment, the microcontroller may be in a single integrated circuit package.

According to a further embodiment, a method for providing an ultrasonic ranging measurement device may comprise the steps of: providing a microcontroller that may have a central processor and memory, and a plurality of core independent peripherals (CIPs); selecting the (CIPs) from the group consisting of any one or more of a capture compare pulse width modulation (CCP), a comparator (CMP), a configurable logic cell (CLC), a data signal modulator (DSM), a hardware limit timer (HLT), a fixed voltage reference (FVR), an operational amplifier (OPA), a programmable ramp generator (PRG), a pulse width modulation generator (PWM), and a timer counter register (TMR); coupling an ultrasonic transmitting transducer to the DSM; and coupling an ultrasonic receiving transducer to a receive OPA; generating signals from the DM to be transmitted as ultrasonic pulses from the ultrasonic transmitting transducer; receiving reflected ultrasonic pulses from an object with the ultrasonic receiving transducer and generating receive signals to the receive OPA; and storing times between the transmitted ultrasonic pulse signals and the corresponding reflected ultrasonic pulse signals that may be received and detected.

According to a further embodiment of the method may comprise the steps of: transmitting the ultrasonic pulse signals; receiving and detecting the reflected ultrasonic pulses; and storing the times between the transmitted ultrasonic pulse signals and the corresponding reflected ultrasonic pulse signals that may be done without intervention from the central processor of the microcontroller.

BRIEF DESCRIPTION OF THE DRAWINGS

A more complete understanding of the present disclosure may be acquired by referring to the following description taken in conjunction with the accompanying drawings wherein.

Figure 1:
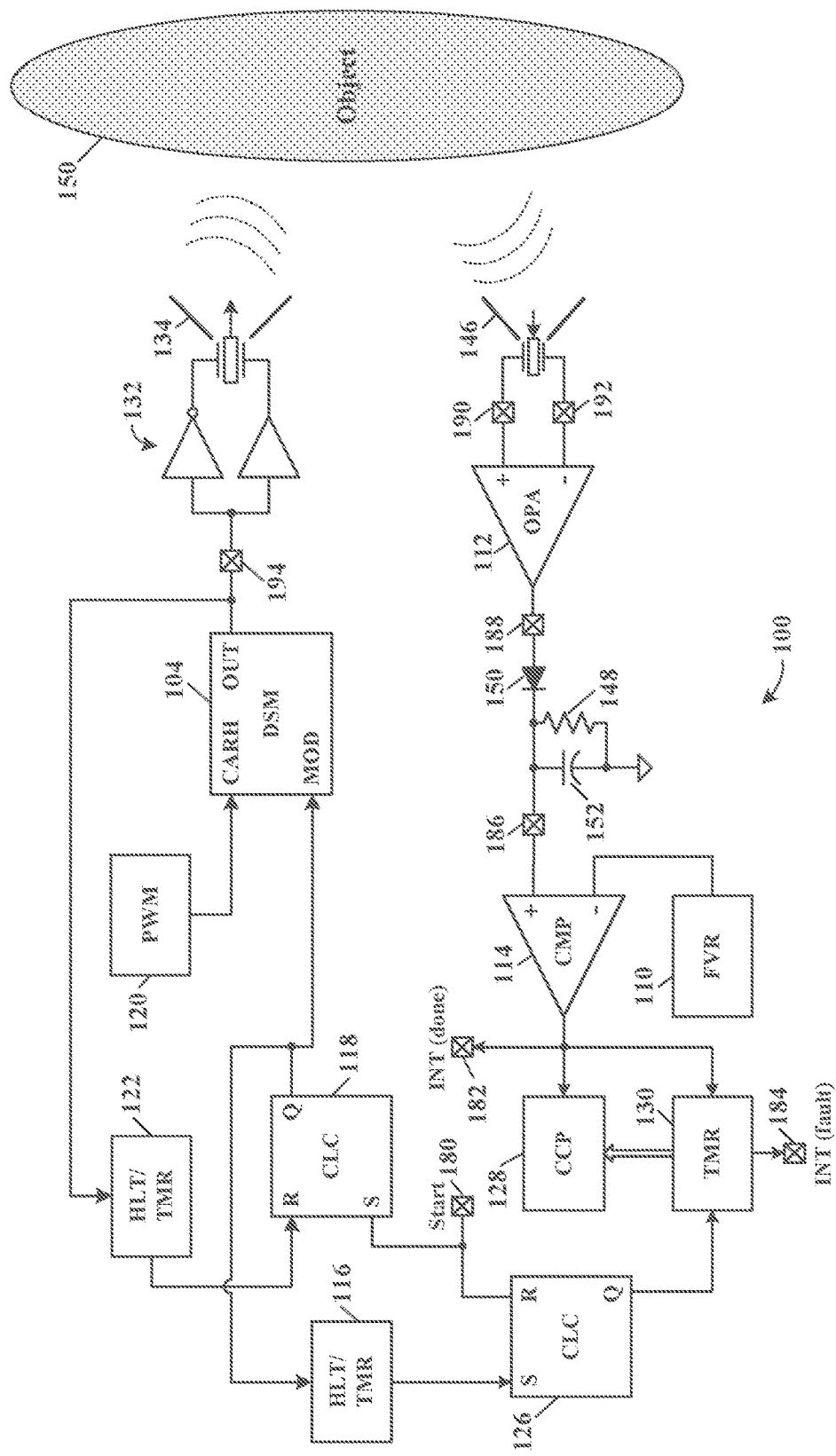
FIG. 1 illustrates a schematic block diagram of an ultrasonic ranging device comprising a microcontroller having a plurality of core independent peripherals (CIPs), according to a specific example embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

DETAILED DESCRIPTION

According to various embodiments of this disclosure, a ranging function may be implemented using a collection of core independent peripherals (CIPs) in a microcontroller. For example, it may use a pulse width modulation (PWM) peripheral to generate a high frequency drive signal, a counter to set the duration of the PWM drive signal (pulse), and a second timer coupled to a comparator to measure the time it takes to receive back a reflection from an object of the ranging signal. As a whole, the ranging peripheral allows the user to set a bit to start the ranging, and receive an interrupt when the ranging measurement has completed. Alternative aspects of the design allow time dependent return pulse detection sensitivity and/or gain adjustments. The solution according to various embodiments presented herein is a configurable ultrasonic ranging peripheral without software overhead to a central processor of a microcontroller during operation thereof. The ultrasonic ranging peripheral uses on chip resources for most of its functions and therefore requires very few external components. It's set and forget nature may be based on CIP based timers, signal generators and configurable logic cells.

Referring now to the drawings, the details of example embodiments are schematically illustrated. Like elements in the drawings will be represented by like numbers, and similar elements will be represented by like numbers with a different lower case letter suffix.

Referring to FIG. 1, depicted is a schematic block diagram of an ultrasonic ranging device comprising a microcontroller having a plurality of core independent peripherals (CIPs), according to a specific example embodiment of this disclosure. A microcontroller, generally represented by the numeral 100, may comprise a plurality of core independent peripherals (CIPs), for example but are not limited to, the following peripherals: Data Signal Modulator (DSM) 104, Fixed Voltage Reference (FVR) 110, Operational Amplifier (OPA) 112, Comparator (CMP) 114, Hardware Limit Timers (HLT) 116 and 122, Configurable Logic Cells (CLC) 118 and 126, Pulse Width Modulation (PWM) Generator 120, Capture Compare pulse width modulation (CCP) 128, and Timer Counter Register (TMR) 130. The CLC may comprise, for example but is not limited to, four modules; wherein each module may be configured as flip-flops and/or a variety of logic combinations such as NOR, NAND, XNOR, AND, OR, XOR and other gates, etc. A user may select from a variety of internal and external signals to provide input signals to these modules. The output signals can be either used internally and/or coupled to external nodes (pins) 180-194 of the microcontroller 100. Such logic core independent peripherals allow for simple combinatorial and sequential logic functions to be added without the necessity of additional external devices.

The core independent peripherals (CIP) and exemplary interconnections thereof for an ultrasonic range detection application are shown in FIG. 1. According to this embodiment, a start bit at input node 180 triggers a SR-flip flop defined by the CLC 128. This couples a PWM signal from the output of the PWM 120 to the carrier high (CARH) input of the DSM 104. The PWM signal is passed through the DSM 104 and is coupled to an external driver 132 which drives an ultrasonic (acoustic) transmitting transducer 134 to generate a pulse of a ultrasonic sound having a frequency of about 40 KHz with a pulse duration determined by the HLT/TMR 122 in combination with the CLC 118 having its Q-output coupled to the modulation (MOD) input of the DSM 104. The HLT/TMR 122 is activated by a PWM signal on the output of the DSM 104, and when it times out the SR flip-flop of the CLC 118 is reset, ending the PWM pulse from the DSM 104. The high-to-low transition at the output of the SR flip-flop of the CLC 118 triggers the HLT/TMR 116 configured as a one-shot timer. This one-shot timer (HLT/TMR 116) provides the necessary dead time between ultrasonic signal transmit and receive, so residual oscillations from the ultrasonic transmitting transducer 134 element do not generate a false signal during the receiver operation. When the one-shot timer (HLT/TMR 116) times out, the second SR flip-flop CLC 126 is set thereby enabling the timer gate TMR 130 to start counting the time it takes to detected a reflected return ultrasonic signal. When a reflected return ultrasonic signal is received and amplified by the OPA 112, a peak detector comprising diode 150, resistor 148 and capacitor 152; may be coupled to an input of the CMP 114 that will cause the output of the CMP 114 to initiate a capture event to store the time count from the TMR 130 in the CCP 128. This action also generates an interrupt 182 that notifies the program running in the central processor of the microcontroller of a receipt and capture of the time required for the round trip of the ultrasonic pulse. If no DC signal of sufficient amplitude is received at the input of the CMP 114 then a time out of the TMR 130 will trigger a fault interrupt 184 (no ultrasonic return signal received).

Figure 2:
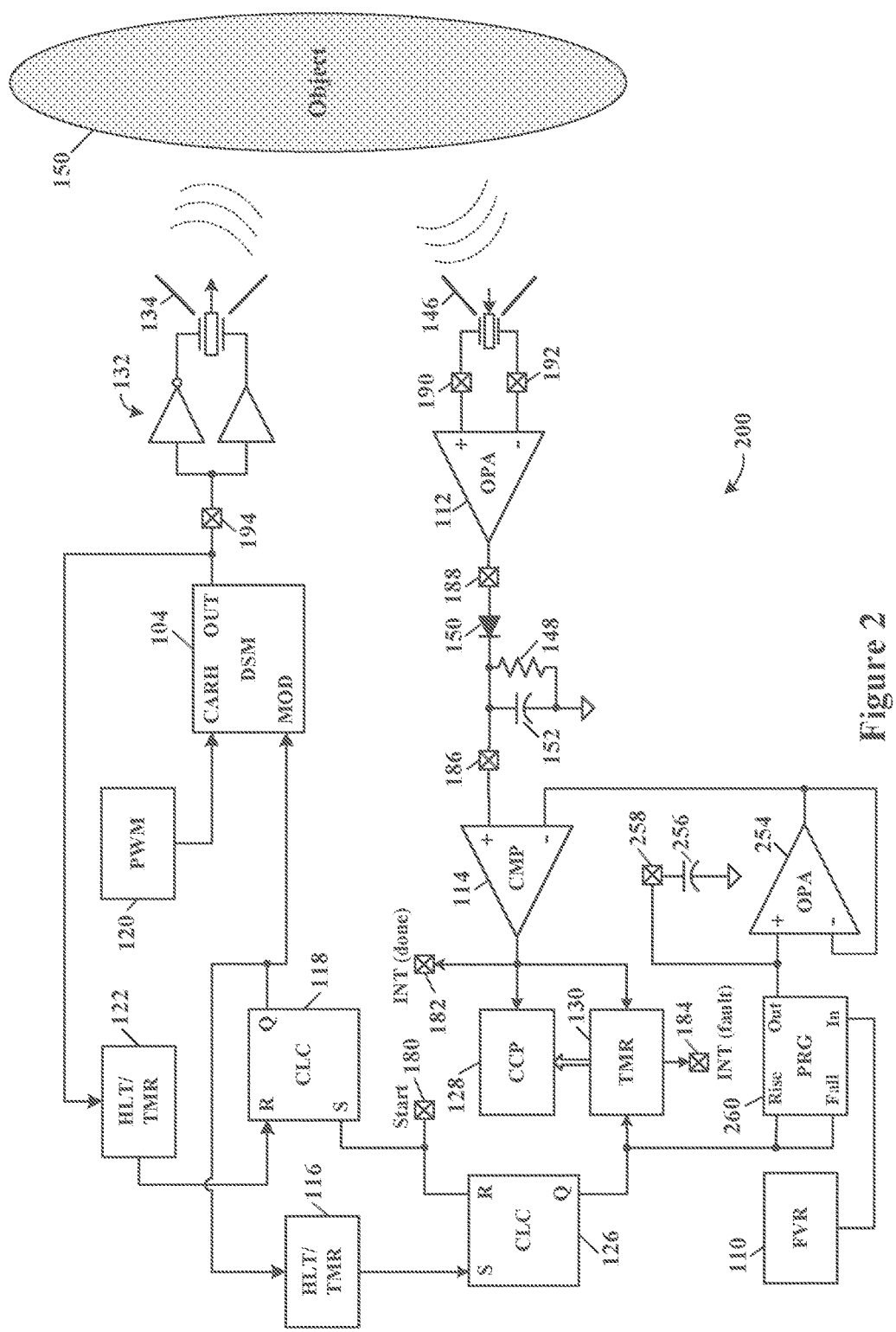
FIG. 2 illustrates a schematic block diagram of an ultrasonic ranging device comprising a microcontroller having a plurality of core independent peripherals (CIPs), according to another specific example embodiment of this disclosure.

Referring now to FIG. 2, depicted is a schematic block diagram of an ultrasonic ranging device comprising a microcontroller having a plurality of core independent peripherals (CIPs), according to another specific example embodiment of this disclosure. A microcontroller, generally represented by the numeral 200, may be used as an ultrasonic ranging device and function in substantially the same way as the one shown in FIG. 1 and described hereinabove, except that a programmable ramp generator (PRG) 260 has been substituted for the function of the FVR 110 of FIG. 1.

The output voltage from the peak detector (diode 150, resistor 148 and capacitor 152) may be compared to a receiver reference voltage from the PRG 260 using the CMP 114. The receiver reference voltage from the PRG 260 provides a falling ramp voltage so that a weaker received signal reflected from longer distances may be detected. This falling ramp voltage may be produced by the PRG 260 which may be coupled to a unity gain OPA 254 that may provide a buffered output to the negative input of the CMP 114. The PRG 260 may be configured to run as a falling ramp generator with its timing dependent on the CLC 126 and its reference voltage input may be coupled to a fixed voltage reference FVR 210. When the CLC 126 output is reset, the PRG 260 goes up to the fixed reference voltage from the FVR 210, and when the CLC 126 is set, the PRG 260 output provides a falling ramp voltage. However, the falling ramp voltage produced by the PRG 260 may last for a very short period of time compared to the period needed for long distance detection. Due to this, an external capacitor 256 may be coupled to the OPA 254 output via an external connection node 258. The value of the external capacitor 256 is large enough to have a sufficient falling ramp voltage over time for better receiver sensitivity. When the peak detector output reaches the receiver reference voltage, the CMP 114 output will be set. This event triggers the capture mode of the CCP 128. This captured value from the CCP 128 will be part of the round trip time of the ultrasonic pulse. However, a trade off exists between distance and noise immunity in that a lower receiver reference voltage will make the CMP 114 more susceptible to switching on noise instead of the desired reflected ultrasonic pulse.

Figure 3:
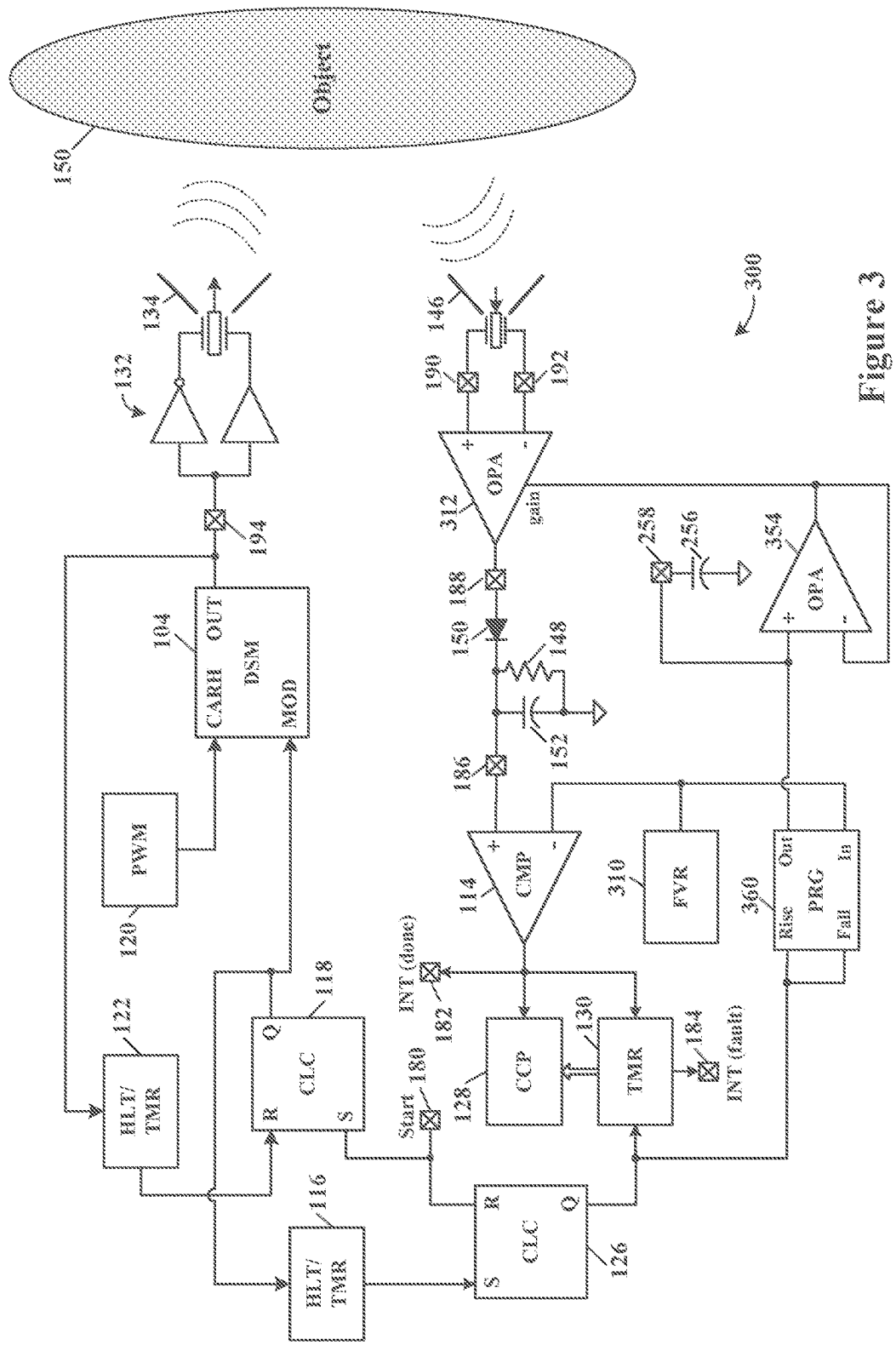
FIG. 3 illustrates a schematic block diagram of an ultrasonic ranging device comprising a microcontroller having a plurality of core independent peripherals (CIPs), according to yet another specific example embodiment of this disclosure.

Referring now to FIG. 3, depicted is a schematic block diagram of an ultrasonic ranging device comprising a microcontroller having a plurality of core independent peripherals (CIPs), according to yet another specific example embodiment of this disclosure. A microcontroller, generally represented by the numeral 300, may be used as an ultrasonic ranging device and function in substantially the same way as the one shown in FIG. 1 and described hereinabove, except that a programmable ramp generator (PRG) 360 is now used to control the gain of a programmable gain amplifier, OPA 312.

In the circuit shown in FIG. 3, a reference voltage from FVR 310 may be coupled to the programmable ramp generator, PRG 360, which again may be coupled with an external capacitor 256 to increase voltage ramp time consistent with the ultrasonic pulse round trip travel time. However, an internal capacitance may also be used if available. The output of the PRG 360 may be coupled to a buffer amplifier, OPA 354, which may be coupled to and control the gain of a variable gain amplifier, OPA 312. However, a trade off exists between distance and noise immunity in that a higher gain receiver will make the CMP 114 more susceptible to switching on noise instead of the desired reflected ultrasonic pulse.

Figure 4:
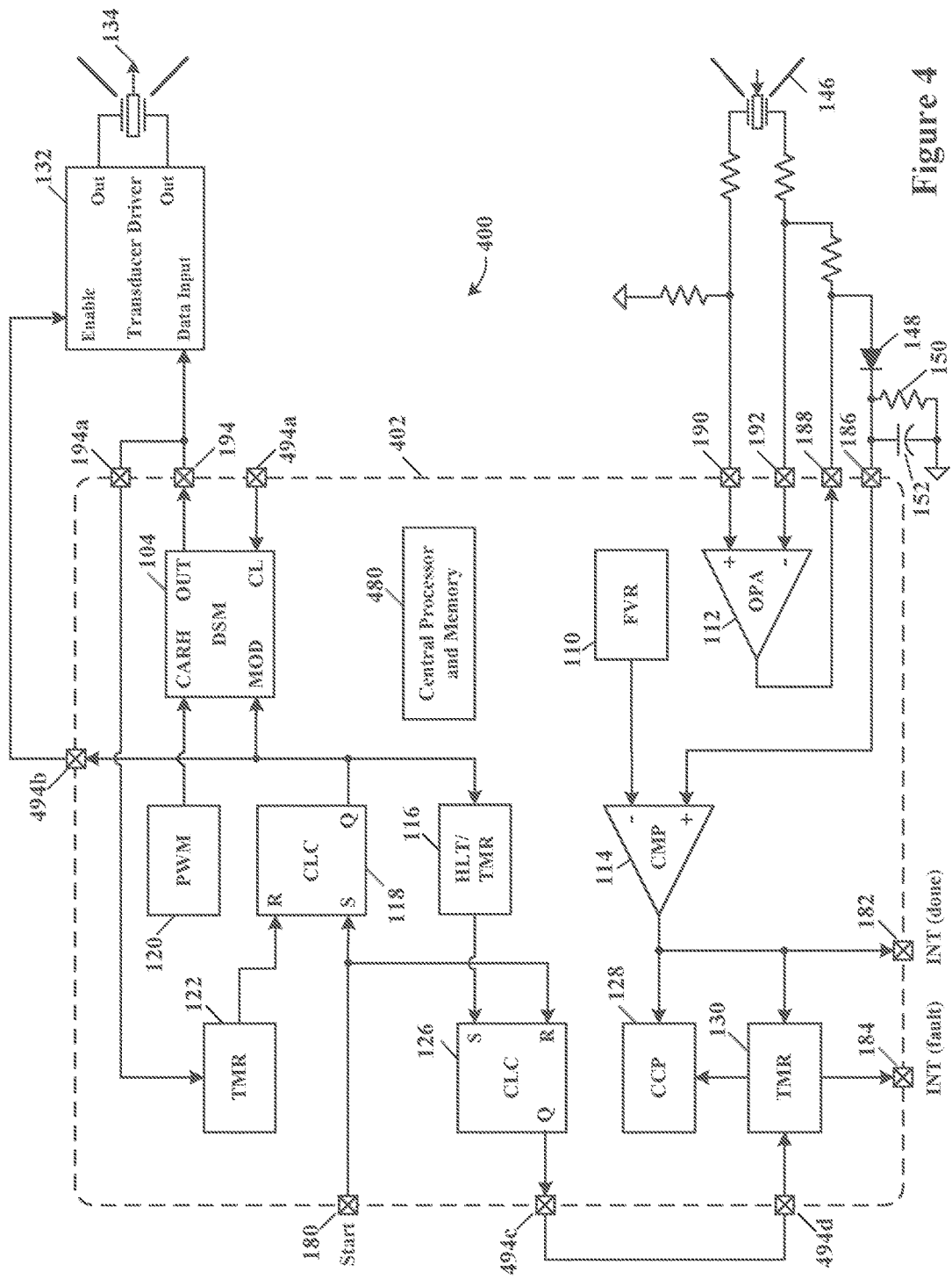
FIG. 4 illustrates a schematic block diagram of a microcontroller integrated circuit package comprising the ultrasonic ranging device shown in FIG. 1.

Referring now to FIG. 4, depicted is a schematic block diagram of a microcontroller integrated circuit package comprising the ultrasonic ranging device shown in FIG. 1. The ranging device shown in FIG. 1 may be provided with a microcontroller 400 comprising an integrated circuit package 402 and the aforementioned CIPs and further comprises a central processor and memory 480. Once the CIPs have been configured (using configuration registers not shown) they become independent in operation from the central processor and memory 480, and only interact therewith upon a Start input and interrupt outputs. Various external connection nodes (pins) 180-194, 494 may be provided on the microcontroller 400 integrated circuit package.

Figure 5:
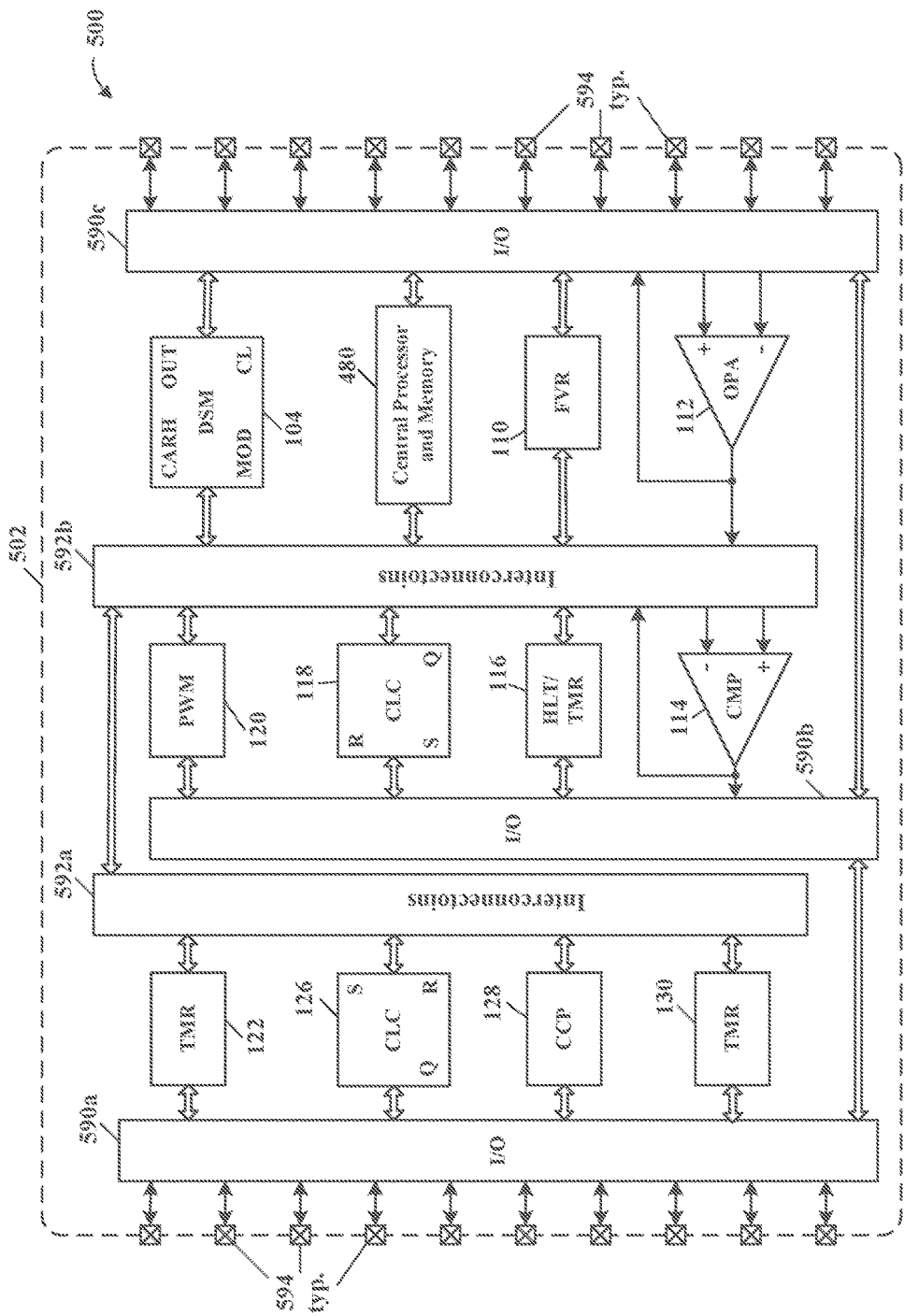
FIG. 5 illustrates a schematic block diagram of a microcontroller integrated circuit package comprising core independent peripherals (CIPs) and programmable interconnections thereto, according to the teachings of this disclosure.

Referring now to FIG. 5, depicted is a schematic block diagram of a microcontroller integrated circuit package comprising core independent peripherals (CIPs) and programmable interconnections thereto, according to the teachings of this disclosure. A microcontroller, generally represented by the numeral 500, may comprise an integrated circuit package 502 having external connection nodes (pin) 594 that may be used for power, ground, input, output and input/output signals. The CIPs, as described more fully hereinabove, may have their input and output signals internally connected to other CIPs and/or to the external connection nodes 590. I/O (input/output) multiplexers (or switching matrixes) 590 may be programmed to interconnect desired nodes 594 to respective signal inputs and output of the CIPs. Interconnection multiplexers 592 may be programmed to interconnect signal inputs and outputs between CIPs.

In FIGS. 1-5, the external nodes (pins) 180-194, 258 and 594 of a microcontroller integrated circuit package, e.g., 402, 502, may be used for external connections of additional components. MPLAB® Code Configurator (MCC) may be utilized to easily configure functionality of the internal (to the microcontroller integrated circuit) CIPs used in this ultrasonic ranging detection application. The MCC may further be used to configure (program) internal interconnections (e.g., interconnection multiplexers 592) between the CIPs and/or external integrated circuit package connections (e.g., I/O multiplexers 590) to the CIPs. The MCC is a user friendly plug-in tool for MPLAB®X IDE which generates drivers for controlling and driving peripherals of PIC® microcontrollers, based on the settings and selections made in its Graphical User Interface (GUI). Refer to the "MPLAB® Code Configurator User's Guide" (DS40001725) for further information on how to install and set up the MCC in MPLAB® X IDE, available at www.microchip.com all of which are incorporated by reference herein for all purposes. MPLAB® and PIC® are registered trademarks of Microchip Technology Inc., the assignee of the present patent application.

The various CIPs used in the specific example embodiments shown herein are further described as follows: The DSM peripheral is described in Microchip data sheet "Data signal Modulator", DS39744. The CLC peripheral is described in Microchip data sheet "Configurable Logic Cell", DS33949. The CCP (capture compare, PWM and Timer) peripheral is described in Microchip data sheet "Capture/Compare/PWM/Timer," DS33035. The comparator peripheral is described in Microchip data sheet "Dual Comparator Module", DS39710. The I/O ports are for example described in Microchip data sheet "I/O Ports", DS70193. Other peripherals such as digital-to-analog converters (DACs), in particular reference voltage generators, programmable gain amplifier (PGA), and a programmable ramp generator (PRG) may be used. All of the aforementioned respective data sheets are available from Microchip Technology Inc., the assignee of the present patent application, and all are hereby incorporated by reference herein for all purposes.

Microchip Application Note AN1536, latest version DS00001536B, has further detailed information on using the core independent peripherals (CIPs) in a microcontroller for ranging applications, theory and application of ranging devices, and design and programming thereof, and is hereby incorporated by reference herein for all purposes.

The invention claimed is:

1. An ultrasonic ranging measurement device, comprising:
   a microcontroller comprising
      a central processor and memory,
      a plurality of core independent peripherals (CIPs) including at least:
         a capture compare pulse width modulation (CCP),
         a comparator (CMP),
         a first and second configurable logic cells (CLC) each at least configurable as a RS flip-flop,
         a data signal modulator (DSM),
         a fixed voltage reference (FVR),
         an operational amplifier (OPA),
         a pulse width modulation generator (PWM), and
         a first, second and third timer (TMR) each coupled with a timer counter register;
   an ultrasonic transmitting transducer coupled to the DSM; and
   an ultrasonic receiving transducer coupled to the OPA;
   wherein the selected CIPs are configured to generate signals to be transmitted as ultrasonic pulses from the ultrasonic transmitting transducer, receive signals representing reflected ultrasonic pulses from an object with the ultrasonic receiving transducer, detect the reflected ultrasonic pulse signals, and store times between the transmitted ultrasonic pulse signals and the corresponding reflected ultrasonic pulse signals that are received and detected.

2. The ultrasonic ranging measurement device according to claim 1, wherein the CIPs generate the ultrasonic pulse signals, receive and detect the reflected ultrasonic pulse signals and store the times between the transmitted ultrasonic pulse signals and the corresponding reflected ultrasonic pulse signals without intervention from the central processor of the microcontroller.

3. The ultrasonic ranging measurement device according to claim 1, wherein logic functions of the CLC are selected from the group consisting of a flip-flop, a NOR gate, an NAND gate, a XNOR gate, an AND gate, an OR gate, and a XOR gate.

4. The ultrasonic ranging measurement device according to claim 3, wherein the CLC comprises at least two of the logic functions.

5. The ultrasonic ranging measurement device according to claim 1, wherein:
   an output from the DSM is coupled to the ultrasonic transmitting transducer;
   the PWM is coupled to a first input of the DSM;
   wherein the first CLC configured as a RS flip-flop has an output coupled to a second input of the DSM; and
   wherein the first TMR has an input coupled to the output of the DSM, and an output coupled to a reset input of the first CLC;
   wherein a start signal is coupled to a set input of the first CLC, whereby an ultrasonic pulse is generated each time the start signal is asserted and the ultrasonic pulse has a pulse duration determined by the first TMR.

6. The ultrasonic ranging measurement device according to claim 5, further comprising:
   a peak voltage detector coupled to an output of the OPA;
   wherein a first input of the CMP is coupled to an output of the peak voltage detector, and a second input of the CMP is coupled to the FVR, wherein when a voltage from the peak voltage detector is greater than a reference voltage from the FVR an output of the CMP changes from a first logic level to a second logic level; and
   wherein inputs of the CCP are coupled to the second TMR, wherein the CCP stores a time count value from the second TMR when the CMP output changes from the first logic level to the second logic level;
   wherein the second TMR resets back to a zero time count value after the start signal is asserted.

7. The ultrasonic ranging measurement device according to claim 6, wherein
   the third TMR is configured as a one-shot timer and coupled between the output of the first CLC and a set input of the second CLC; and
   the second CLC has a reset input coupled to the start signal and an output coupled to a start input of the second TMR;
   wherein the second CLC starts the second TMR counting after the third TMR one-shot timer has timed out.

8. The ultrasonic ranging measurement device according to claim 6, wherein
   a done signal is generated from the output of the CMP when the reflected ultrasonic pulse is detected; and
   a fault signal is generated by the second TMR when no reflected ultrasonic pulse is detected.

9. The ultrasonic ranging measurement device according to claim 6, wherein the input to the OPA comprises differential inputs coupled to the ultrasonic receiving transducer having differential outputs.

10. The ultrasonic ranging measurement device according to claim 5, further comprising:
   a programmable ramp generator (PRG) within the microcontroller, and
   a peak voltage detector coupled to an output of the OPA;
   wherein the CMP has a first input coupled to an output of the peak voltage detector, and a second input coupled to the PRG, wherein when a voltage from the peak voltage detector is greater than a voltage from the PRG an output of the CMP changes from a first logic level to a second logic level; and
   wherein the CCP has inputs coupled to the second TMR, wherein the CCP stores a time count value from the second TMR when the CMP output changes from the first logic level to the second logic level;
   wherein the second TMR resets back to a zero time count value after the start signal is asserted.

11. The ultrasonic ranging measurement device according to claim 10, wherein the voltage from the PRG decreases over time, thereby causing the CMP to change from the first logic level to the second logic level at a lower voltage from the peak voltage detector over time.

12. The ultrasonic ranging measurement device according to claim 11, wherein an input to the PRG is configured to be coupled to the FVR.

13. The ultrasonic ranging measurement device according to claim 12, further comprising within the microcontroller a buffer OPA coupled between the PRG and the second input of the CMP.

14. The ultrasonic ranging measurement device according to claim 7, further comprising:
   a programmable ramp generator (PRG) within the microcontroller,
   wherein the OPA is a gain controllable OPA, and wherein the PRG is coupled to and configured to control the gain of the gain controllable OPA, wherein the PRG is further configured to cause the gain of the gain controllable OPA to increase over time, thereby increasing receive sensitivity for the reflected ultrasonic pulse.

15. The ultrasonic ranging measurement device according to claim 14, wherein the PRG starts increasing the receive sensitivity of the OPA once the second TMR starts counting.

16. The ultrasonic ranging measurement device according to claim 1, wherein the ultrasonic pulses are at about 40 kHz.

17. The ultrasonic ranging measurement device according to claim 1, wherein the microcontroller is in a single integrated circuit package.

18. A method for providing an ultrasonic ranging measurement device, comprising the steps of:
   providing a microcontroller having a central processor and memory, and a plurality of core independent peripherals (CIPs);
   selecting from the plurality of CIPs at least the following:
      a capture compare pulse width modulation (CCP),
      a comparator (CMP),
      a first and second configurable logic cell (CLC) each at least configurable as a RS flip-flop,
      a data signal modulator (DSM),
      a fixed voltage reference (FVR),
      an operational amplifier (OPA),
      a pulse width modulation generator (PWM), and
      a first, second and third timer (TMR) each coupled with a timer counter register;
   coupling an ultrasonic transmitting transducer to the DSM; and
   coupling an ultrasonic receiving transducer to the OPA;
   generating signals from the DM to be transmitted as ultrasonic pulses from the ultrasonic transmitting transducer;
   receiving reflected ultrasonic pulses from an object with the ultrasonic receiving transducer and generating receive signals to the OPA; and
   storing times between the transmitted ultrasonic pulse signals and the corresponding reflected ultrasonic pulse signals that are received and detected.

19. The method according to claim 18, wherein the steps of:
   transmitting the ultrasonic pulse signals;
   receiving and detecting the reflected ultrasonic pulses; and
   storing the times between the transmitted ultrasonic pulse signals and the corresponding reflected ultrasonic pulse signals are done without intervention from the central processor of the microcontroller.

20. The method according to claim 18, further comprising:
   configuring the microcontroller:
   to couple an output from the DSM to the ultrasonic transmitting transducer;
   to couple the PWM to a first input of the DSM;
   to configure the first CLC as a RS flip-flop and to couple an output of the CLC to a second input of the DSM; and
   to couple an input of the first TMR to the output of the DSM, and an output of the first TMR to a reset input of the first CLC; and
   forwarding a start signal to a set input of the first CLC, whereby an ultrasonic pulse is generated each time the start signal is asserted and the ultrasonic pulse has a pulse duration determined by the first TMR.

21. The method according to claim 20, further comprising:
   providing a peak voltage detector coupled to an output of the OPA;
   configuring the microcontroller to couple a first input of the CMP to an output of the peak voltage detector, and to couple a second input of the CMP to the FVR, wherein when a voltage from the peak voltage detector is greater than a reference voltage from the FVR an output of the CMP changes from a first logic level to a second logic level; and
   to couple inputs of the CCP to the second TMR, wherein the CCP stores a time count value from the second TMR when the CMP output changes from the first logic level to the second logic level; and
   resetting the second TMR back to a zero time count value after the start signal is asserted.

22. The method according to claim 21, wherein
   configuring the third TMR as a one-shot timer and coupling the third TMR between the output of the first CLC and a set input of the second CLC; and
   coupling a reset input of the second CLC to the start signal and an output coupled to a start input of the second TMR; and
   starting the second TMR counting by the CLC after the third TMR one-shot timer has timed out.

23. The method according to claim 21, wherein
   Generating a done signal by the output of the CMP when the reflected ultrasonic pulse is detected; and
   generating a fault signal by the second TMR when no reflected ultrasonic pulse is detected.

24. The method according to claim 21,
providing a peak voltage detector coupled to an output of the OPA;
configuring the microcontroller:
to enable a programmable ramp generator (PRG) within the microcontroller;
to couple a first input of the CMP to an output of the peak voltage detector, and to couple a second input of the CMP to the PRG, wherein when a voltage from the peak voltage detector is greater than a voltage from the PRG an output of the CMP changes from a first logic level to a second logic level; and
to couple inputs of the CCP to the second TMR, wherein the CCP stores a time count value from the second TMR when the CMP output changes from the first logic level to the second logic level; and
resetting the second TMR back to a zero time count value after the start signal is asserted.

25. The method according to claim 24, wherein the voltage from the PRG decreases over time, thereby causing the CMP to change from the first logic level to the second logic level at a lower voltage from the peak voltage detector over time.

26. The method according to claim 25, further comprising the step of configuring the microcontroller to couple an input to the PRG with the FVR.

27. The method according to claim 26, further comprising the step of configuring the microcontroller to couple a buffer OPA within the microcontroller between the PRG and the second input of the CMP.

28. The method according to claim 22, further comprising the steps of:
configuring the microcontroller:
to enable a programmable ramp generator (PRG) within the microcontroller,
and to couple the PRG to the OPA and to control a gain of the OPA, wherein the PRG is further configured to cause the gain of the OPA to increase over time, thereby increasing receive sensitivity for the reflected ultrasonic pulse.

29. The method according to claim 28, further comprising the step of controlling the PRG to start increasing the receive sensitivity of the OPA once the second TMR starts counting.

* * * * *